(12) United States Patent
Nordqvist et al.

(10) Patent No.: US 11,053,069 B2
(45) Date of Patent: Jul. 6, 2021

(54) CLOSED CAPSULE WITH OPENING MEANS AND INTEGRAL BARRIER LAYER

(71) Applicant: NESTEC S.A., Vevey (CH)

(72) Inventors: David Nordqvist, Lausanne (CH); Christophe Sebastien Paul Heydel, Chez-le-Bart (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/091,621

(22) PCT Filed: Mar. 30, 2017

(86) PCT No.: PCT/EP2017/057546
§ 371 (c)(1),
(2) Date: Oct. 5, 2018

(87) PCT Pub. No.: WO2017/174434
PCT Pub. Date: Oct. 12, 2017

(65) Prior Publication Data
US 2019/0119036 A1    Apr. 25, 2019

(30) Foreign Application Priority Data
Apr. 7, 2016 (EP) .................................. 16164275

(51) Int. Cl.
*B65D 85/80* (2006.01)
*B32B 27/08* (2006.01)
(Continued)

(52) U.S. Cl.
CPC .......... *B65D 85/8043* (2013.01); *B29C 45/16* (2013.01); *B29C 45/1642* (2013.01);
(Continued)

(58) Field of Classification Search
CPC .............. B65D 85/8043; B65D 85/804; B65D 85/8046; B32B 27/08; B29C 45/1642; B29K 2101/12
See application file for complete search history.

(56) References Cited

U.S. PATENT DOCUMENTS 8,499,682 B2    8/2013    Zangerle
9,221,204 B2    12/2015   Swenson
(Continued)

FOREIGN PATENT DOCUMENTS

CN    102036885    4/2011
CN    102883863    1/2013
(Continued)

OTHER PUBLICATIONS

Chinese Search Report for Application No. 2017800216915.
Chinese Office Action for Application No. 2017800216915 dated Nov. 1, 2019.

*Primary Examiner* — Ericson M Lachica
(74) *Attorney, Agent, or Firm* — K&L Gates LLP

(57) ABSTRACT

The invention relates to a capsule (10) designed for food or beverage preparation, the capsule (10) comprising a cup-shaped base body (1), a top wall (2) and a bottom retaining wall (3) for holding food or beverage preparation ingredients, wherein the base body (1) is made of one single injection-molded piece and wherein a side wall (4) of the base body comprises at least one co-injected multilayer section (5) having two outer layers (5a) being made from a different polymeric material than a core layer (5b), and wherein the base body (1) further comprises a bottom structure (6) which is integrally molded with the side wall (4) and comprising opening means (7) allowing the capsule to be opened at the time of its use.

16 Claims, 1 Drawing Sheet

(51) Int. Cl.
*B65D 85/804* (2006.01)
*B29C 45/16* (2006.01)
*B32B 27/36* (2006.01)
*B32B 27/32* (2006.01)
*B32B 1/02* (2006.01)
*B32B 27/30* (2006.01)
*B32B 15/20* (2006.01)
*B32B 27/10* (2006.01)
*B32B 27/34* (2006.01)
*B32B 3/08* (2006.01)
*B32B 15/08* (2006.01)
*B29K 101/12* (2006.01)
*B29L 31/00* (2006.01)

(52) U.S. Cl.
CPC .......... *B32B 1/02* (2013.01); *B32B 3/08* (2013.01); *B32B 15/08* (2013.01); *B32B 15/20* (2013.01); *B32B 27/08* (2013.01); *B32B 27/10* (2013.01); *B32B 27/306* (2013.01); *B32B 27/32* (2013.01); *B32B 27/34* (2013.01); *B32B 27/36* (2013.01); *B29K 2101/12* (2013.01); *B29L 2031/7174* (2013.01); *B32B 2250/03* (2013.01); *B32B 2250/24* (2013.01); *B32B 2250/242* (2013.01); *B32B 2250/246* (2013.01); *B32B 2250/40* (2013.01); *B32B 2307/7244* (2013.01); *B32B 2307/7246* (2013.01); *B32B 2307/732* (2013.01); *B32B 2439/40* (2013.01); *B32B 2439/70* (2013.01)

(56) References Cited

U.S. PATENT DOCUMENTS

| | | | |
|---|---|---|---|
| 2007/0259139 A1* | 11/2007 | Furneaux | B32B 27/10 428/34.3 |
| 2008/0264267 A1* | 10/2008 | Doglioni Majer | B65D 85/8043 99/295 |
| 2009/0214713 A1* | 8/2009 | Banim | B65D 65/466 426/80 |
| 2010/0282091 A1* | 11/2010 | Doleac | B65D 85/8043 99/295 |
| 2010/0303964 A1* | 12/2010 | Beaulieu | B65D 85/8043 426/77 |
| 2010/0307930 A1 | 12/2010 | Zangerle | |
| 2011/0005399 A1* | 1/2011 | Epars | B65D 85/8043 99/295 |
| 2011/0012291 A1* | 1/2011 | Middleton | B29C 45/14336 264/266 |
| 2011/0217496 A1 | 9/2011 | Swenson | |
| 2012/0015122 A1 | 1/2012 | Swenson | |
| 2012/0135171 A1* | 5/2012 | Swenson | B29C 45/0053 428/35.7 |
| 2013/0122157 A1* | 5/2013 | Dogan | B65D 85/8043 426/115 |
| 2013/0216663 A1* | 8/2013 | Dogan | B65D 85/8043 426/115 |
| 2014/0079853 A1 | 3/2014 | Hansen | |
| 2014/0190863 A1 | 7/2014 | Fabozzi et al. | |
| 2014/0272283 A1 | 9/2014 | Swenson | |
| 2014/0349081 A1 | 11/2014 | Swenson | |
| 2016/0052706 A1* | 2/2016 | Talon | B65D 85/8043 426/115 |
| 2016/0107831 A1 | 4/2016 | Talon et al. | |
| 2017/0008694 A1* | 1/2017 | Andreae | B65D 85/8043 |

FOREIGN PATENT DOCUMENTS

| | | |
|---|---|---|
| DE | 102009035058 A1 | 2/2011 |
| WO | 8100231 A1 | 2/2011 |
| WO | 2011115905 | 9/2011 |
| WO | 2014161653 | 10/2014 |
| WO | WO-2014161653 A1 * | 10/2014 ........... B65D 65/466 |

* cited by examiner

CLOSED CAPSULE WITH OPENING MEANS AND INTEGRAL BARRIER LAYER

CROSS REFERENCE TO RELATED APPLICATIONS

The present application is a National Stage of International Application No. PCT/EP2017/057546, filed on Mar. 30, 2017, which claims priority to European Patent Application No. 16164275.6, filed on Apr. 7, 2016, the entire contents of which are being incorporated herein by reference.

FIELD OF THE INVENTION

The present invention relates to a capsule for preparation of a food product such as a beverage, which comprises integrally formed wall means with a barrier layer made by a co-injection moulding process.

BACKGROUND OF THE INVENTION

Capsules for preparation of a food product such as a beverage are widely known in the market. An example of such capsule that is intended for being used with a beverage preparation machine is described in EP 0,512,468 A1. Thereby, beverage ingredients provided in the capsule are made to interact with liquid provided to the capsule in order to form a desired beverage that is then made to leave the capsule. The described capsule is opened under the effect of rising pressure within the capsule, which urges an outlet face of the capsule against opening means such as raised elements provided on a supporting part of the beverage preparation machine. Thereby, the machine-based opening means come into contact with the beverage delivered from the capsule which makes it difficult for contamination and taste reasons, to envisage extracting with this system capsules containing substances other than roasted ground coffee, because of beverage residue present on the supporting part.

EP 1 472 156 A1 aims at providing a solution to this problem by means of a capsule comprising self-opening means which enable the opening of an outlet of the capsule due to increase of pressure within a beverage ingredients containing chamber of the capsule. In particular, upon introduction of liquid via a top membrane, the rise in pressure within the beverage ingredient chamber will press a lower thin film arranged at the outlet area of the capsule against raised and recessed elements situated in a bottom portion of the capsule so as to tear the said thin film and enable the beverage to flow out from the capsule and directly into a mug arranged beneath without contacting a portion of the beverage preparation machine.

These known capsules usually comprise an outer body portion that is formed by thermo-forming or deep drawing of plastic material such as EVOH, polypropylene or polyethylene as single layer. The upper and lower membrane of the capsule delimiting the ingredients containing chamber may be formed of aluminum. Accordingly, the walls enclosing the ingredients containing chamber provide certain barrier properties to oxygen and moisture that guarantee a suitable shelf life of the ingredients.

A drawback of such capsules produced by thermoforming or deep drawing is that the material costs are comparatively high and the design options for the obtained capsule are rather limited. Therefore, a capsule obtainable by other manufacturing methods is sought-after which enables to overcome these drawbacks of the prior art.

Besides thermo-forming and deep drawing, capsules made by in-mould labeling are known, in which a preformed label with barrier properties is provided in a mould and wherein at least one layer of plastic material is injected around the label to form a body portion of the capsule. These capsules however suffer the disadvantage that due to common inaccuracies regarding the positioning of the label in the mould during the manufacturing process, certain areas in the outer body portion of the capsule are not fully covered with the in-mould label and thus provide a leak in the outer barrier to oxygen and moisture.

Also known are capsules made from a co-injection moulding process in which at least two layers of plastic material are co-injected into a mould and, wherein preferably at least one layer comprises enhanced barrier properties against oxygen and moisture.

U.S. Pat. No. 9,221,204 B2 relates to such co-injection moulding process and to a capsule designed for beverage preparation made therefrom. The capsule comprises a co-injected body portion having an inner barrier layer enclosed by an outer skin layer. The barrier layer extends to a bottom portion of the capsule in which an aperture for outflow of the beverage is formed. A separate piercing element for opening a lower thin foil of the capsule may be arranged in the aperture of the bottom portion.

While this capsule may provide enhanced barrier properties to oxygen and moisture due to the integrated inner barrier layer, the extension of the barrier layer to the bottom portion leads to increased manufacturing costs as the material for the barrier layer is comparatively more expensive than the outer skin material. Furthermore, the provision of a separate piercing element in the bottom portion of the capsule requires a rather complex manufacturing process.

In view of the cited prior art, the present invention seeks to provide an enhanced capsule comprising capsule-based opening means allowing the capsule to be opened at the time of its use and which capsule enables a particular facilitated manufacturing process at reduced costs. At the same time, optimal barrier properties against oxygen and moisture are desired.

This object is solved by the independent claim. The dependent claims define further preferred embodiments of the invention.

SUMMARY OF THE INVENTION

The invention relates to a capsule designed for food or beverage preparation, the capsule comprising a cup-shaped base body, a top wall and a bottom retaining wall for holding food or beverage preparation ingredients, wherein the base body is made of one single injection-molded piece and wherein a side wall of the base body comprises at least one co-injected multilayer section having two outer layers being made from a different polymeric material than a core layer, wherein the base body further comprises a bottom structure which is integrally molded with the side wall and comprising opening means allowing the capsule to be opened at the time of its use.

Due to the bottom structure with the opening means being integrally formed with the side wall of the capsule base body, the capsule according to the present invention can be formed in a particular facilitated and cost-effective manufacturing process. Thereby, the co-injected multilayer section of the base body provides enhanced barrier properties compared to a single layer material in prior art capsules. As the capsule comprises its own opening means it is further enabled that different food or beverage ingredients may be dissolved and/or extracted upon provision of liquid to the capsule without prejudice to the taste and without the risk of cross-contamination when preparing different beverages in sequence.

The top wall, the bottom retaining wall and the co-injected multilayer section of the side wall of the base body portion of the capsule preferably form respectively delimit a closed chamber for holding the food or beverage ingredients. The top wall, the bottom retaining wall and the co-injected multilayer section of the side wall are preferably arranged with respect to each other to overlap each other at their interfaces. Thereby, the term "overlap" relates to an overlap of directly adjacent entities, i.e. entities that contact each other. It is to be understood that the closed chamber may comprise additional parts or elements arranged within the above-identified parts of the capsule and which may serve the purpose of dividing the closed chamber in sub-regions or holding the food or beverage ingredients correctly in place within the closed chamber.

The opening means are preferably situated outside of the closed chamber of the capsule for holding the food or beverage ingredients. As a preference, the opening means are situated below the bottom retaining wall and/or are at least in part in contact therewith.

The opening of the capsule is achieved by relative engagement of the opening means with the bottom retaining wall of the capsule. The relative engagement of the opening means and of the retaining wall is preferably performed under the effect of rise in pressure of fluid provided to the capsule. In particular, upon injection of fluid to the capsule respectively to the closed chamber thereof, the bottom retaining wall is moved under the effect of the rise in pressure against the opening means.

The opening means is preferably a profiled section suitable for puncturing the bottom retaining wall. The opening means may comprise at least one puncturing element or a plurality of puncturing elements. The profiled section respectively the puncturing means may have any possible shape, for example points, blades, knives, needles, cone-shaped protrusions, pyramid-shaped protrusions and the like.

The opening means and the bottom retaining wall are preferably defined and arranged with respect to each other in such a way that opening occurs in a determined pressure range, preferably at a given pressure corresponding to an optimized extraction pressure. The extraction pressure may vary from 4 to 8 bar, preferably, in the order of 6 bar. The optimum pressure may vary according to the substances to be extracted.

In a preferred embodiment, the co-injected multilayer section having two outer layers being made from a different polymeric material than a core layer extends throughout the complete side wall or side walls of the base body. The side wall of the base body is preferably an integrally formed annular wall. The side wall may be cylindrically shaped or may have the shape of a truncated cone in sectional side view.

The opening means of the bottom structure are preferably made from a single-layer material. Said single layer material is co-injected with the multilayer section of the capsule side wall. In a further preferred embodiment, the complete bottom structure or alternatively more than 50%, preferably more than 75% or even more preferably more than 90% of the bottom structure may be formed from a single-layer material. The single-layer material preferably corresponds to the material as used for the two outer layers of the multilayer section of the side wall. Accordingly, the material costs for the capsule can be reduced compared to capsules in which the co-injected multilayer section extends essentially throughout the whole capsule.

Such preferred embodiment of the capsule base body comprising a multilayer section and a single layer material section may be obtained by co-injecting the core layer between the two outer layers only within a certain region of the body, e.g. the region which presents the side wall of the produced capsule body, while for the rest of the capsule body the outer co-injected layers are joined together in the mould to present a single layer material section. Hence, the portions of the integrally formed capsule base body that do not comprise the multilayer arrangement are preferably made from a single layer material which corresponds to the material used for the outer layers of the multilayer section.

The co-injected multilayer section preferably extends from the side wall of the base body to an outer portion of the bottom structure such as to at least partially overlap with the bottom retaining wall (when seen in top view). Thereby, the term "overlap" relates to an overlap of directly adjacent entities, i.e. entities that contact each other. Accordingly, the barrier properties of the capsule at the interface of the sidewall and the bottom retaining wall are enhanced.

The bottom retaining wall may be connected to the bottom structure and/or to the sidewall of the capsule by welding or by an adhesive. The bottom retaining wall is preferably connected with its outer annular portion at the outer portion of the bottom structure.

In a particularly preferred embodiment, the co-injected multilayer section preferably terminates in a contact region between the bottom retaining wall and the bottom structure, i.e. in a region in which the bottom retaining wall is connected to the bottom structure.

The outer portion of the bottom structure preferably comprises a section made from co-injected multilayer material and a section made from single layer material.

The outer portion of the bottom structure may be an essentially planar or horizontally arranged annular shoulder portion which is situated radially outside of the opening means. The outer portion may be formed by an annular disc-shaped element and may comprise an upper and a lower surface on opposing sides of the shoulder portion that may be arranged parallel to each other. The bottom retaining wall of the capsule is preferably connected to the upper annular surface of the shoulder portion.

The cup-shaped base body of the capsule is preferably equipped with an integrally formed flange-like rim. The flange-like rim preferably extends radially outwards from a top portion of the side wall of the base body.

The top wall is preferably connected to the flange-like rim and/or to the side wall of the capsule by welding or by an adhesive. The top wall is preferably connected with its outer annular portion at the flange-like rim.

In a preferred embodiment, the co-injected multilayer section extends from the side wall of the base body to the flange-like rim such as to at least partially overlap with top wall of the capsule (when seen in top view). Thereby, the term "overlap" relates to an overlap of directly adjacent entities, i.e. entities that contact each other. Accordingly, the barrier properties of the capsule at the interface of the sidewall and the top wall are enhanced.

The co-injected multilayer section preferably terminates in a contact region between the top wall and the flange-like rim, i.e. in a region in which the top wall is connected to the flange-like rim.

The material of the outer layers of the multilayer section is preferably selected from a polymer group of PVDC, PP, PE, PA or PLA. The thickness of the outer layers is preferably between 5 and 50 microns, more preferably between 10 and 30 microns.

The core layer of the multilayer section of the base body is preferably made from a gas barrier polymer, such as e.g. EVOH, PVOH, PP or PET. The core layer preferably has increased barrier properties to oxygen compared to the outer layers of the multilayer section. The core layer is of preferably essentially homogenous thickness within the two outer layers of the multilayer section. The thickness of the core layer preferably lies between 0.1 and 50 microns, more preferably between 0.3 and 20 microns.

The bottom retaining wall and/or the top wall is preferably a thin film or a membrane able to be punctured. The thickness of the retaining wall and/or the top wall preferably lies between 10 and 300 microns.

The top wall and the bottom retaining wall are made of a material comprising oxygen and moisture barrier properties such as EVOH or aluminium. In a preferred embodiment, the material of the top wall and bottom retaining wall is chosen from the group consisting of aluminium, an aluminium/plastic composite, an aluminium/plastic/paper composite, single- or multi-layer plastic, and multi-layer barrier plastic.

Below or above the bottom retaining wall, a filter may be arranged within the capsule, which filter may serve the purpose to hold back the food or beverage ingredients during the beverage preparation process. The material of the filter may be chosen from the group consisting of filter paper, woven fibres and nonwoven fibres. The fibres may be made of PET (polyethylene terephthalate) or PP (polypropylene) or another polymer.

The integral bottom structure is provided with at least one opening, preferably in a centre portion thereof. The bottom structure may as well comprise a plurality of openings. The openings preferably serve the purpose of enabling an outflow of the resulting beverage from the capsule.

An upper surface of the bottom structure, from which the opening means preferably protrude may be designed for collection of the resulting beverage and for directing said beverage towards an outlet opening of the bottom structure.

In a preferred embodiment, the integral bottom structure of the capsule body is provided with one or more preferably cylindrical ribs in an intermediate annular portion of the bottom structure, which is arranged between the centre portion and the outer portion of the bottom structure. The preferably cylindrical ribs may be arranged to protrude downwards from the bottom structure, i.e. towards the outside of the capsule.

The opening means are preferably arranged in the intermediate annular portion of the bottom structure, radially inside of the outer portion thereof.

The outer portion of the bottom structure, which lies radially outside the centre portion and the intermediate portion thereof, is preferably provided with a non-profiled section.

As a preference, the capsule does not have an undercut section at the outside of the integral bottom structure.

The capsule body according to the present invention is preferably obtainable by co-injecting moulding at least two different polymeric materials from the side of a flange-like rim of the capsule. This may be obtained due to the provision of an annular respectively ring-shaped gate connected to the used injection mould and is in contrast to known co-injection moulding manufacturing processes in which the capsule is injected from the side of the bottom portion of the capsule.

As alternative, the capsule body may be formed by co-injection the capsule body materials from the side of the bottom respectively the outlet of the capsule.

The capsule according to the present invention is preferably rotational symmetric, i.e. symmetric along its vertical axis, in particular with regards to the capsule sidewall and the rim of the capsule. The integral bottom structure of the capsule is preferably not rotational symmetric about the vertical axis of the capsule. Thereby, in particular the opening means of the integral bottom structure are preferably situated in a non-symmetric arrangement about the vertical axis of the capsule. Hence, the opening means of the bottom structure may be arranged in any desired pattern, while the capsule may be produced with the above-described facilitated manufacturing process.

The food or beverage ingredients provided in the capsule are preferably chosen from the group consisting of roasted ground coffee, tea, instant coffee, a mixture of roasted ground coffee and instant coffee, a syrup concentrate, a fruit extract concentrate, a chocolate product, a milk-based product or any other dehydrated edible substance, such as dehydrated stock. The liquid to be used for beverage preparation is preferably water of any temperature.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
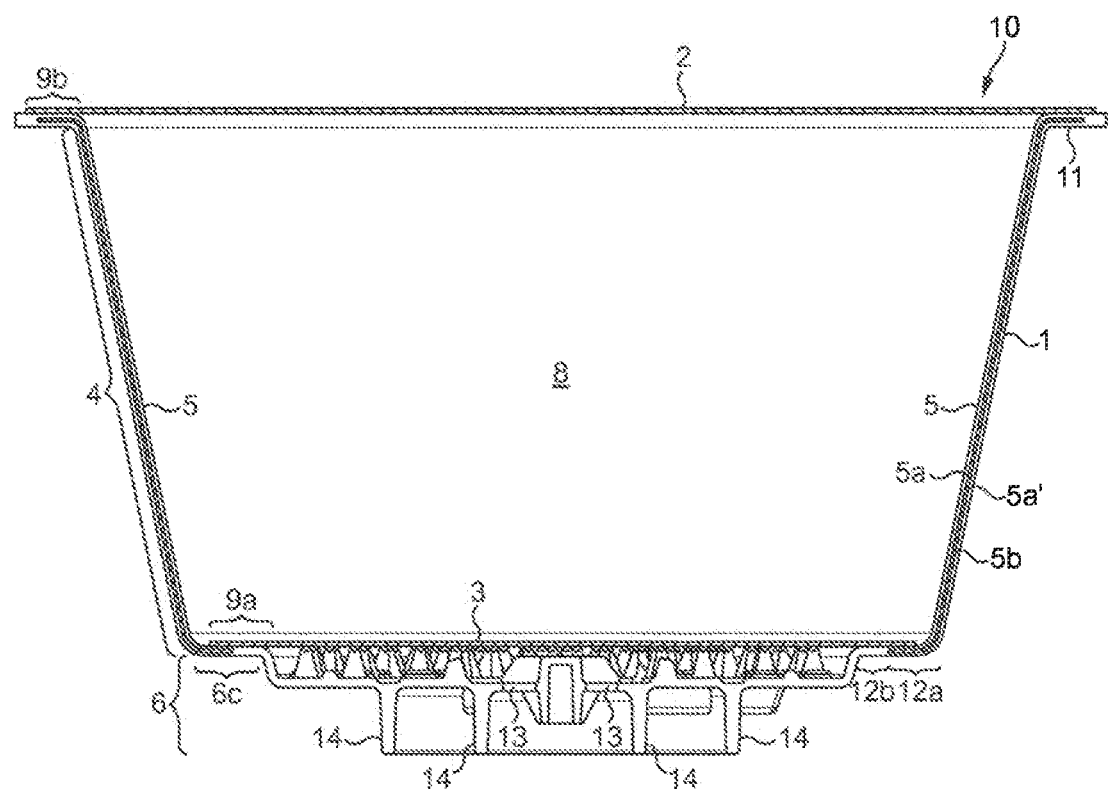
FIG. 1 is a sectional side view of a preferred embodiment of the capsule according to the invention.
Figure 2:
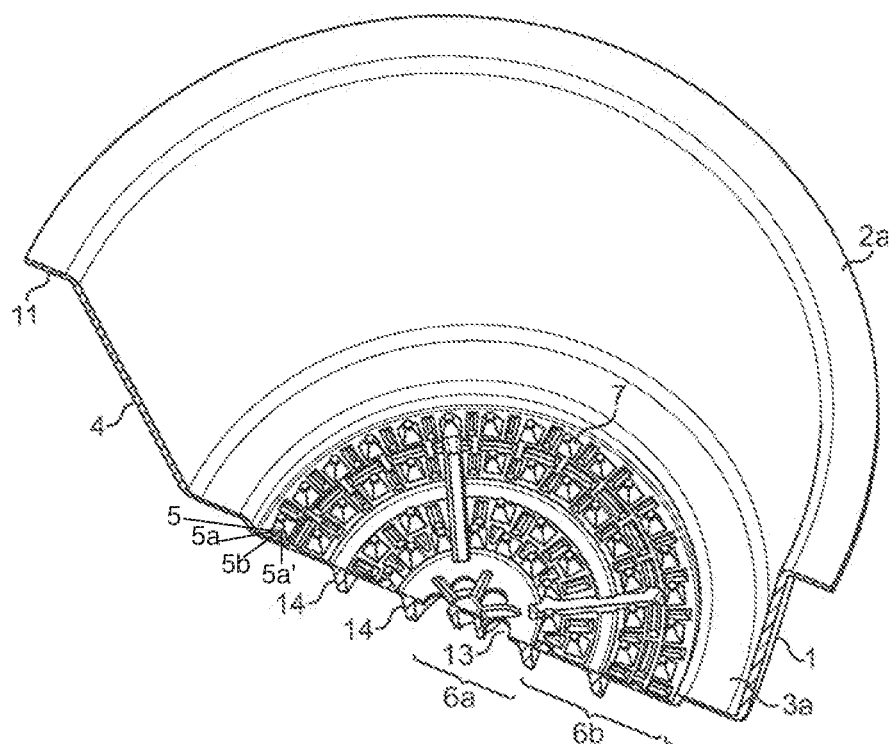
FIG. 2 is a perspective sectional side view of the co-injection moulded base body of the capsule according to FIG. 1.

A preferred embodiment of the capsule according to the present invention is now described with reference to FIGS. 1 and 2.

The capsule 10 comprises a preferably rotational symmetric cup-shaped base body 1 made of a single injection moulded piece. The base body 1 is obtainable by a co-injection moulding process of at least two different polymeric materials. The capsule 10 further comprises a top wall 2 and a bottom retaining wall 3 connected to the capsule base body 1. The top wall 2 and the retaining wall 3 preferably comprise barrier properties against oxygen and moisture.

The base body 1 comprises an annular side wall 4, preferably of truncated cone shape when seen in side view. The base body 1 further comprises a bottom structure 6 which is integrally molded with the side wall 4 and which comprises opening means 7 allowing the capsule to be opened at the time of its use. The opening means 7 are preferably integrally formed with the bottom structure 6 and the side wall 4 in a single injection moulding process.

The bottom structure 6 of the base body 1 preferably comprises a centre portion 6a, in which at least one outlet opening 13 is provided, an intermediate annular portion 6b, in which the opening means 7 are arranged, and an outer annular portion 6c, which is preferably a non-profiled section. In the intermediate annular portion 6b, one or more preferably cylindrical ribs 14 may be arranged which preferably protrude towards the exterior of the capsule.

The bottom retaining wall 3 is connected to an upper surface 3a of the outer annular portion 6c of the bottom structure 6 in an annular contact region 9a. The top wall 2 is connected to an upper surface 2a of the flange-like rim 11 in an annular contact region 9b. The bottom retaining wall 3 and the top wall 2 may be connected to the capsule base body 1 by means of welding or adhesive. The bottom retaining wall 3, the top wall 2 and the base body 1 are connected in a preferably hermetically sealed manner.

The side wall 4 of the base body 1 comprises at least one co-injected multilayer section 5 having two outer layers 5a and 5a' being made from a different polymeric material than a core layer 5b. At least the core layer 5b preferably comprises enhanced barrier properties against oxygen and moisture. The co-injected multilayer section 5 preferably extends throughout the whole side wall 4 of the base body 1. The rest of the base body 1 which is not formed in the described multilayer arrangement is preferably formed of a single layer material. Thereby, the single layer material preferably corresponds to the material used for the outer layers 5a and 5a' of the multilayer section 5.

The co-injected multilayer section 5, the top wall 2 and the bottom retaining wall 3 are arranged with respect to each other to form a closed chamber 8 for holding food or beverage preparation ingredients therein. The closed chamber 8 is preferably hermetically closed in order to provide an optimal barrier against the ingress of oxygen and moisture into the chamber 8. The co-injected multilayer section 5, the top wall 2 and the bottom retaining wall 3 preferably overlap at their interfaces respectively at their contact regions.

The co-injected multilayer section 5 preferably extends from the side wall 4 into the outer annular portion 6c of the bottom structure such as to overlap with the bottom retaining wall 3 connected to an upper surface 3a of the outer annular portion 6c. Thereby, the co-injected multilayer section 5 preferably terminates in a contact area 9a between the bottom retaining wall 3 and the outer annular portion 6c of the bottom structure 6, i.e. in an area 9a in which the bottom retaining wall 3 is connected to the outer annular portion 6c. The co-injected multilayer section 5 can also extend beyond the area 9a, that is to say, closer to the centre of the bottom structure, near the dispensing area 13.

The outer portion 6c of the bottom structure 6 preferably comprises a section made from co-injected multilayer material 12a and a section made from single layer material 12b. The outer annular portion 6c may thus present an interface between a single layer material section and the multilayer section of the base body. The outer portion 6c of the bottom structure 6 is preferably an essentially planar or horizontally arranged annular shoulder portion.

The co-injected multilayer section 5 preferably also extends from the side wall 4 of the base body to the flange-like rim 11 such as to at least partially overlap with top wall 2 of the capsule. Thereby, the co-injected multilayer section 5 terminates in a contact area 9b between the top wall 2 and the flange-like rim 11, i.e. in an area in which the top wall 2 is connected to the flange-like rim 11. Accordingly, the core layer 5b does preferably not extend through the exterior surface of the capsule base body 1.

In one embodiment of the invention, the opening means (7) of the bottom structure (6) also comprises at least one co-injected multilayer section (5) having two outer layers (5a and 5a') being made from a different polymeric material than a core layer (5b).

The material of the outer layers 5a of the multilayer section 5 is preferably selected from a polymer group of PVDC, PP, PE, PA, PLA. The thickness of the outer layers is preferably between 5 and 50 microns, more preferably between 10 and 30 microns.

The core layer 5b of the multilayer section 5 is preferably made from a gas barrier polymer, such as e.g. EVOH, PVOH, PP or PET. The core layer 5b preferably has increased barrier properties to oxygen compared to the outer layers 5a of the multilayer section. The thickness of the core layer 5b preferably lies between 0.1 and 50 microns, more preferably between 0.3 and 20 microns. Moisture barrier can be achieved by a material of the outer layers, for instance polypropylene, or another suitable moisture-barrier polymer known in the art of packaging.

The bottom retaining wall 3 and/or the top wall 2 is preferably a thin film or a membrane able to be punctured. The thickness of the retaining wall 3 and/or the top wall 2 preferably lies between 10 and 300 microns.

The top wall 2 and the bottom retaining wall 3 are made of a material comprising oxygen and moisture barrier properties such as EVOH or aluminium or other multilayer laminate. In a preferred embodiment, the material of the top wall 2 and bottom retaining wall 3 is chosen from the group consisting of aluminium, an aluminium/plastic composite, an aluminium/plastic/paper composite, single-layer or multi-layer plastic.

The opening means 7 of the base body 1 are housed outside of the closed chamber 8 and may be situated in close vicinity and/or may be arranged to abut at the bottom retaining wall 3. The opening means 7 are preferably integrally formed profiled portions directed towards the bottom retaining wall 3 of the capsule. The profiled portions preferably constitute at least one or a plurality of puncturing elements. The puncturing elements may have any possible shape, for example points, blades, knives, needles, cone-shaped protrusions, pyramid-shaped protrusions and the like.

A configuration with a plurality of puncturing elements is preferred because such a surface acts as a pressure-spreading means and has the effect of allowing the pressure of the liquid to rise sufficiently inside the capsule before puncturing occurs. Accordingly, a desired pressure is built-up within the capsule for enhancing the extraction characteristics of the beverage before opening of the bottom retaining wall occurs.

The upper surface of the bottom structure 6 between the opening means 7 respectively from which the opening means 7 protrude is preferably designed to collect the beverage drained from the opened bottom retaining wall 3 and guide said beverage towards the at least one beverage outlet 13 of the capsule.

In order to produce a beverage from the capsule 10 according to the invention, the capsule 10 may be introduced into a beverage preparation machine. Therein, a fluid is injected into the capsule 10 by means of dedicated liquid injection means of the beverage preparation machine. These are preferably designed to pierce the top wall 2 of the capsule and to provide a fluid under pressure into the closed chamber 8. The rise in pressure in the capsule will then press the bottom retaining wall 3 against the opening means 7 which will lead to an opening or tearing of the retaining wall 3 after sufficient pressure has been built-up within the capsule. The resulting beverage, which is prepared due to interaction of the enclosed food or beverage ingredients with the injected fluid, will then be drained from the opened retaining wall 3 and through the at least one outlet 13 of the capsule.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A capsule designed for food or beverage preparation, the capsule comprising a cup-shaped base body, a top wall and a bottom retaining wall for holding food or beverage preparation ingredients,
   wherein the cup-shaped base body is made of one single injection-molded piece, and a side wall of the cup-shaped base body comprises at least one co-injected multilayer section having two outer layers made from a different polymeric material than a core layer,
   the cup-shaped base body comprises a bottom structure which is integrally molded with the side wall,
   the bottom structure comprises an opening member configured to allow the capsule to be opened, and the bottom structure further comprises profiled portions integrally formed in the opening member of the bottom structure,
   the profiled portions are directed towards the bottom retaining wall of the capsule,
   the bottom retaining wall comprises a flat bottom, and the profiled portions have uniform height extending to the flat bottom of the bottom retaining wall,
   the top wall and the at least one co-injected multilayer section of the side wall are arranged with respect to each other to overlap at their interfaces, and
   the at least one co-injected multilayer section extends from the side wall of the cup-shaped base body to an outer annular portion of the bottom structure, the outer annular portion is connected to and extends inwardly from the side wall of the cup-shaped base body, and the bottom retaining wall and the at least one co-injected multilayer section are arranged with respect to each other to overlap at their interfaces,
   the bottom retaining wall is connected to an upper surface of the outer annular portion of the bottom structure, the at least one co-injected multilayer section terminates in a contact area between the bottom retaining wall and the outer annular portion of the bottom structure where the bottom retaining wall is connected to the outer annular portion,
   the bottom retaining wall covers the profiled portions of the bottom structure,
   the outer annular portion of the bottom structure comprises a first section made from a co-injected multilayer material and a second section made from a single layer material, the first section extends inwardly from the side wall of the cup-shaped base body and the second section extends inwardly from the first section.

2. The capsule according to claim 1, wherein the opening member is housed outside a closed chamber for holding the food or beverage preparation ingredients.

3. The capsule according to claim 1, wherein the opening member of the bottom structure is made from a single-layer material.

4. The capsule according to claim 1, wherein the outer annular portion of the bottom structure is an essentially planar or horizontally arranged annular shoulder portion which is situated radially outside of the opening member.

5. The capsule according to claim 1, wherein the opening member of the bottom structure also comprises at least one co-injected multilayer section having two outer layers being made from a different polymeric material than a core layer.

6. The capsule according to claim 1, wherein the top wall, the bottom retaining wall and at least the core layer of the at least one co-injected multilayer section of the side wall have barrier properties against oxygen and moisture.

7. The capsule according to claim 1, wherein the core layer of the at least one co-injected multilayer section is made from a gas barrier polymer.

8. The capsule of claim 1, wherein the top wall and the bottom retaining wall are made of a material that has oxygen and moisture barrier properties.

9. The capsule according to claim 1, wherein the bottom retaining wall and/or the top wall is a film able to be punctured.

10. The capsule according to claim 1, wherein the capsule is configured such that opening of the capsule is achieved by engagement of the profiled portions integrally formed in the opening member with the bottom retaining wall of the capsule, and the engagement is performed under the effect of a rise in pressure of a fluid in the capsule.

11. The capsule of claim 1, wherein the bottom structure comprises at least one opening.

12. The capsule of claim 1, wherein the bottom structure comprises one or more ribs.

13. The capsule of claim 1, wherein an outside of the bottom structure is flat.

14. The capsule according to claim 1, wherein the cup-shaped base body is obtainable by co-injecting molding at least two different polymeric materials from a side of a flanged rim of the capsule.

15. The capsule according to claim 1, wherein the two outer layers of the at least one co-injected multilayer section is made from a material selected from the group consisting of PVDC, PA, PLA, and combinations thereof.

16. The capsule according to claim 1, wherein the core layer of the at least one co-injected multilayer section is made from PVOH.

* * * * *